UNITED STATES PATENT OFFICE.

EMIL KNOEVENAGEL, OF HEIDELBERG, GERMANY, ASSIGNOR TO ATHION-GESELLSCHAFT MIT BESCHRÄNKTER HAFTUNG, OF MANNHEIM-WALDHOF, GERMANY, A SOCIETY OF GERMANY.

PROCESS FOR THE REMOVAL OF CARBON DISULFID FROM GASES.

1,035,972.  Specification of Letters Patent.  Patented Aug. 20, 1912.

No Drawing.  Application filed February 15, 1912. Serial No. 677,814.

*To all whom it may concern:*

Be it known that I, EMIL KNOEVENAGEL, a subject of the German Emperor, and resident of Heidelberg, Germany, have invented certain new and useful Improvements in Processes for the Removal of Carbon Disulfid from Gases, of which the following is a specification.

The greater part of the organic sulfur compounds contained in gases consists of carbon disulfid and the processes for the removal of these compounds have therefore related mainly to the removal of the carbon disulfid, but so far without any practical results.

I have found that alkali-cellulose or alkali-cellulose mixed with lime, forms a cheap absorbent acting at ordinary temperature (and even when the carbon disulfid is highly diluted) it being preferable to first remove the carbonic acid and sulfureted hydrogen from the gases as far as possible in any well known or suitable manner. In carrying out the process, cellulose or cellulose-containing material such for instance as sulfid-cellulose and the waste products therefrom, or sawdust, rags, cotton, cotton waste and the like, are converted into the alkali-compound of the cellulose; the carbon disulfid present in the gases combines with this compound to form cellulose xanthate which can be utilized in any suitable manner. The said purifying mass is owing to its porous nature especially adapted to provide a free passage for the gas, as well as offering as large an absorbing surface as possible to the carbon disulfid. The gas is thus deprived of carbon disulfid and if the usual purification of the gas from sulfureted hydrogen is also effected, the gas gives off almost no sulfurous acid on burning. In this manner among other advantages the illuminating and calorific power of the gases are increased while the specific weight is reduced, so that the gas is rendered more suitable for inflating balloons.

As a good test for ascertaining the degree of purity of the gases triethyl-phosphin for instance may be employed, which combining with the carbon disulfid yields a fine compound which crystallizes in ruby-red prisms.

I claim:

A process for the removal of carbon disulfid even in small quantities from gases, which consists in bringing the gas into contact in suitable apparatus with alkali cellulose.

In testimony whereof I have signed my name to this specification in the presence of two subscribing witnesses.

EMIL KNOEVENAGEL.

Witnesses:
 HERMANN TAEGER,
 A. O. TITTMANN.